(12) United States Patent
Chang

(10) Patent No.: US 8,454,191 B2
(45) Date of Patent: Jun. 4, 2013

(54) LED LIGHTING DEVICE

(75) Inventor: Shao-Han Chang, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 179 days.

(21) Appl. No.: 13/037,401

(22) Filed: Mar. 1, 2011

(65) Prior Publication Data

US 2012/0020066 A1    Jan. 26, 2012

(30) Foreign Application Priority Data

Jul. 22, 2010    (CN) .......................... 2010 1 0234151

(51) Int. Cl.
*F21V 1/00* (2006.01)
(52) U.S. Cl.
USPC ............ 362/217.05; 362/217.01; 362/249.02; 313/114
(58) Field of Classification Search
USPC ....... 362/543–545, 223–225, 217.02–217.07, 362/249.01–249.02
See application file for complete search history.

(56) References Cited

U.S. PATENT DOCUMENTS

| 5,577,833 A * | 11/1996 | English et al. ................. 362/297 |
| 5,857,761 A * | 1/1999 | Abe et al. ....................... 362/551 |
| 2004/0208019 A1 * | 10/2004 | Koizumi et al. ............... 362/545 |
| 2008/0285256 A1 * | 11/2008 | Mezouari et al. ............... 362/23 |
| 2009/0201675 A1 * | 8/2009 | Onishi et al. ................... 362/223 |

FOREIGN PATENT DOCUMENTS

| CN | 201335272 Y | 10/2009 |
| CN | 101666462 A | 3/2010 |
| JP | 2004311162 A | 11/2004 |

* cited by examiner

*Primary Examiner* — Donald Raleigh
(74) *Attorney, Agent, or Firm* — Altis Law Group, Inc.

(57) ABSTRACT

An LED lighting device includes a lampshade, a plurality of LED light sources and a light guiding member. The light guiding member is arranged inside the lampshade, and includes a plurality of plates each having a connecting end, wherein the connecting ends of the plurality of plates are connected together. Each plate includes two surfaces, one or two of which includes a plurality of accentuated portions, and one of the plates defines a light incident surface opposing the LED light sources. After entering the light guiding member from the light incident surface, the light from the LED light sources is reflected between opposite surfaces of each plate of the light guiding member. Light reaching the accentuated portions is diffused and exits the light guiding member, to be finally transmitted outside through the lampshade.

10 Claims, 7 Drawing Sheets

LED LIGHTING DEVICE

BACKGROUND

1. Technical Field

The present disclosure relates to lighting devices and, particularly, to a fluorescent type LED lighting device.

2. Description of Related Art

With the advantages of long service life, low pollution, power conservation, and other benefits, light-emitting diodes (LEDs) are now being widely used in lighting devices. An LED is a point light source with a small radiation angle and strong directionality. To maximize illuminated surface area, a plurality of light-emitting diodes are often distributed in rows on the LED lighting device. However, compared to the almost 360° radiation angle of many fluorescent lamps, the radiation angle of a commonly used LED fluorescent lamp is only about 100° to 140°. Further, high brightness LEDs cause light spots on the lighting surface of the LED lighting device. In order to reduce or eliminate the light spots and achieve a uniform lighting surface, an extra light diffusion film is needed, which may absorb part of the light from the light-emitting diodes, such that the brightness of light illumination of the LED lighting device is reduced.

BRIEF DESCRIPTION OF THE DRAWINGS

Many aspects of the embodiments can be better understood with reference to the following drawings. The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
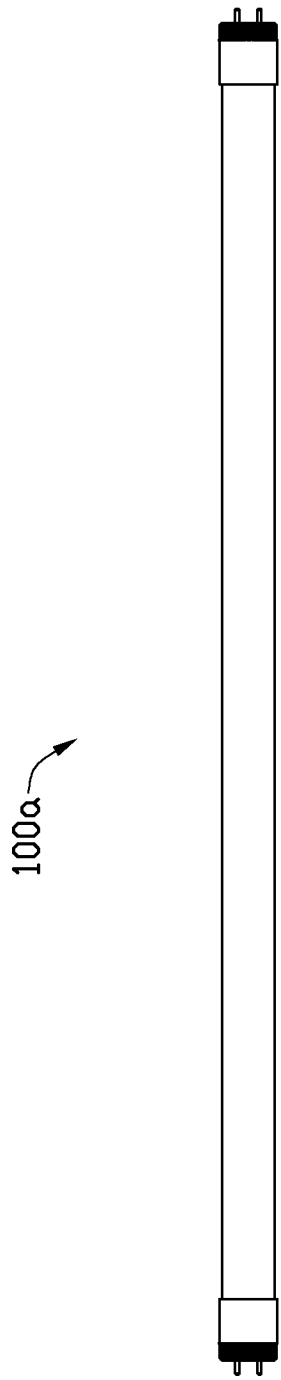
FIG. 1 is a schematic, isometric view of an LED lighting device according to a first embodiment.
Figure 2:
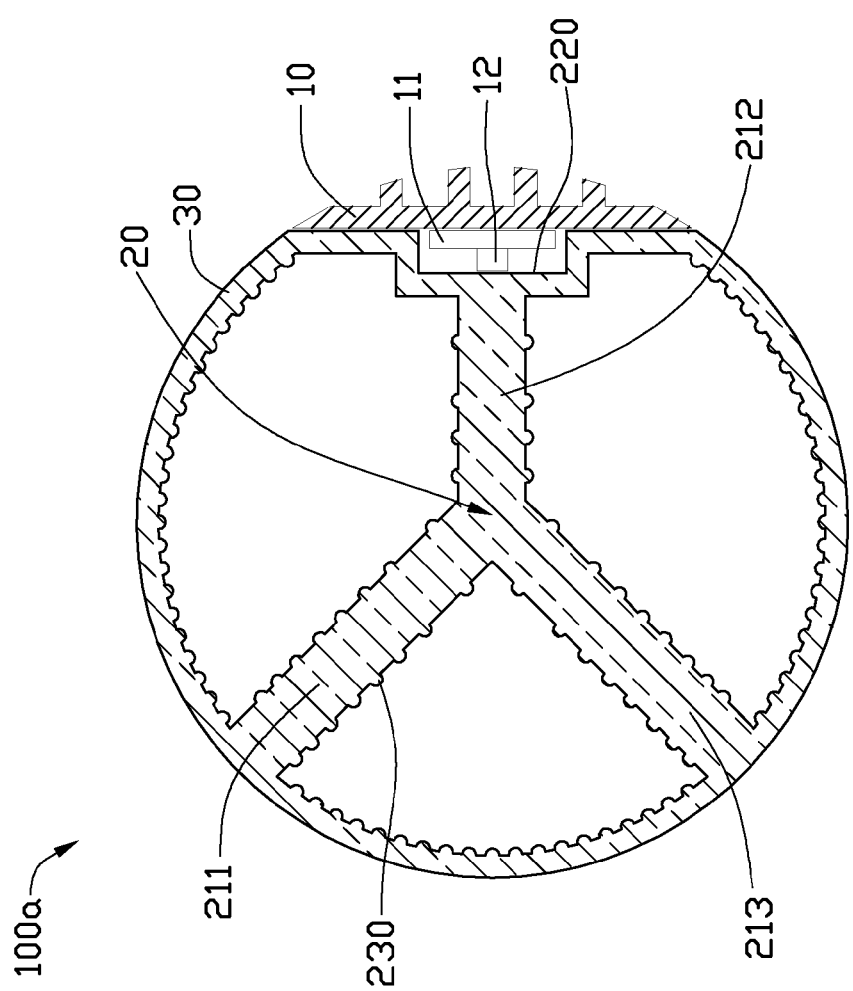
FIG. 2 is a cross-section of the LED lighting device of FIG. 1, which includes a plurality of LED light sources and a light guiding member.

Referring to FIGS. 1 and 2, an LED lighting device 100a according to a first embodiment is illustrated. The LED lighting device 100a, shaped like a standard fluorescent tube, includes a heat sink 10, a circuit board 11, a plurality of LED light sources 12, a light guiding member 20, and a lampshade 30. The circuit board 11 and the lampshade 30 are detachably connected to the heat sink 10. The LED light sources 12 are distributed in a row on the circuit board 11. The heat generated by the LED light sources 12 can be transferred to the ambient air through the heat sink 10.

The light guiding member 20 is arranged inside the lampshade 30, and is made of optical material. The light guiding member 20 includes a plurality of plates each having a connecting end, wherein the connecting ends connect together, and each plate includes two parallel surfaces. In the embodiment, the light guiding member 20 includes a first plate 211, a second plate 212 and a third plate 213, which cooperatively form a Y-shape. In the embodiment, the first plate 211 and the third plate 213 extend radially from one end of the second plate 212. Another end of the second plate 212 includes a light incident surface 220 opposing the LED light sources 12.

Figure 3:
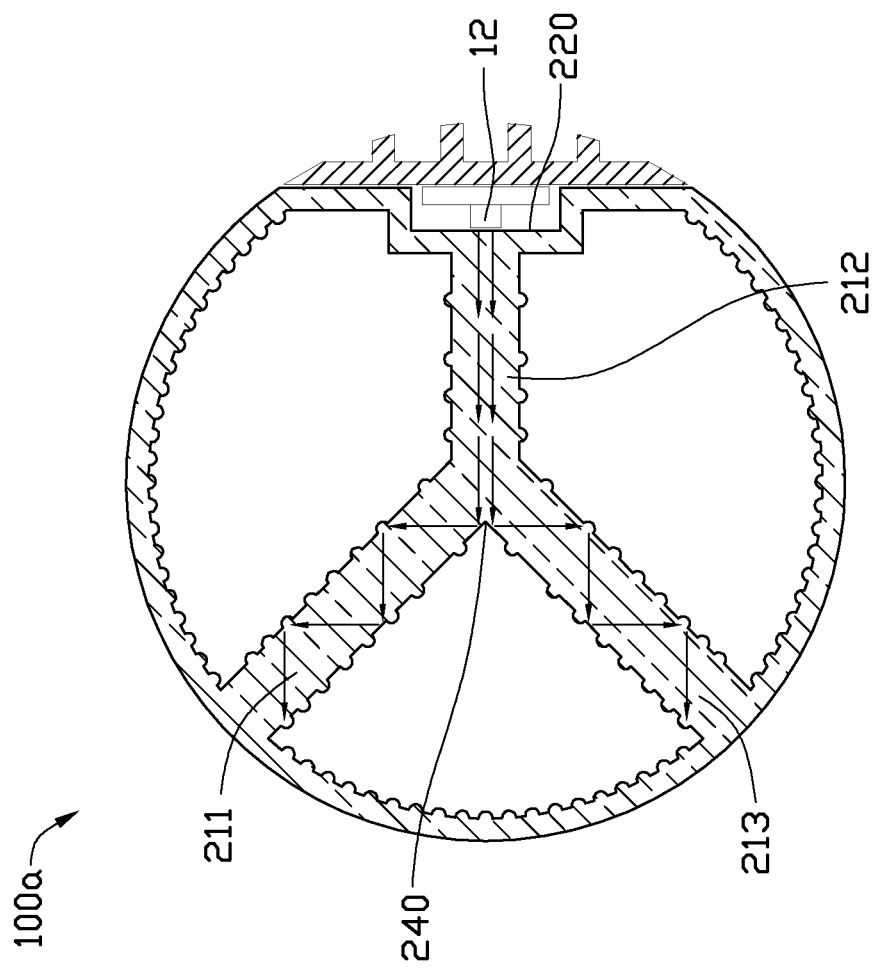
FIG. 3 is a schematic view showing a portion of the light from the LED light sources transmitted in the light guiding member of FIG. 2.

In order to adjust illumination position and intensity on the surfaces of the light guiding member 20, a plurality of accentuated portions 230 such as protuberances and/or recesses are defined at one or more surfaces of the light guiding member 20. Referring to FIG. 3, a total reflection structure 240 is formed at the intersection of the first plate 211 and the third plate 213.

After entering the light guiding member 20 from the light incident surface 220, the light from the LED light sources 12 is reflected between opposite surfaces of each plate of the light guiding member 20. Light is transmitted from the second plate 212 to the first plate and the third plate after reflection by the total reflection structure 240.

In the embodiment, after entering the second plate 212, a portion of the light is directly transmitted to the intersection of the first plate 211 and the third plate 213, and reflected by the total reflection structure 240. Then, a portion of the reflected light is reflected between the opposite surfaces of the first plate 211, and the other portion of the reflected light is reflected between the opposite surfaces of the third plate 213.

Figure 4:
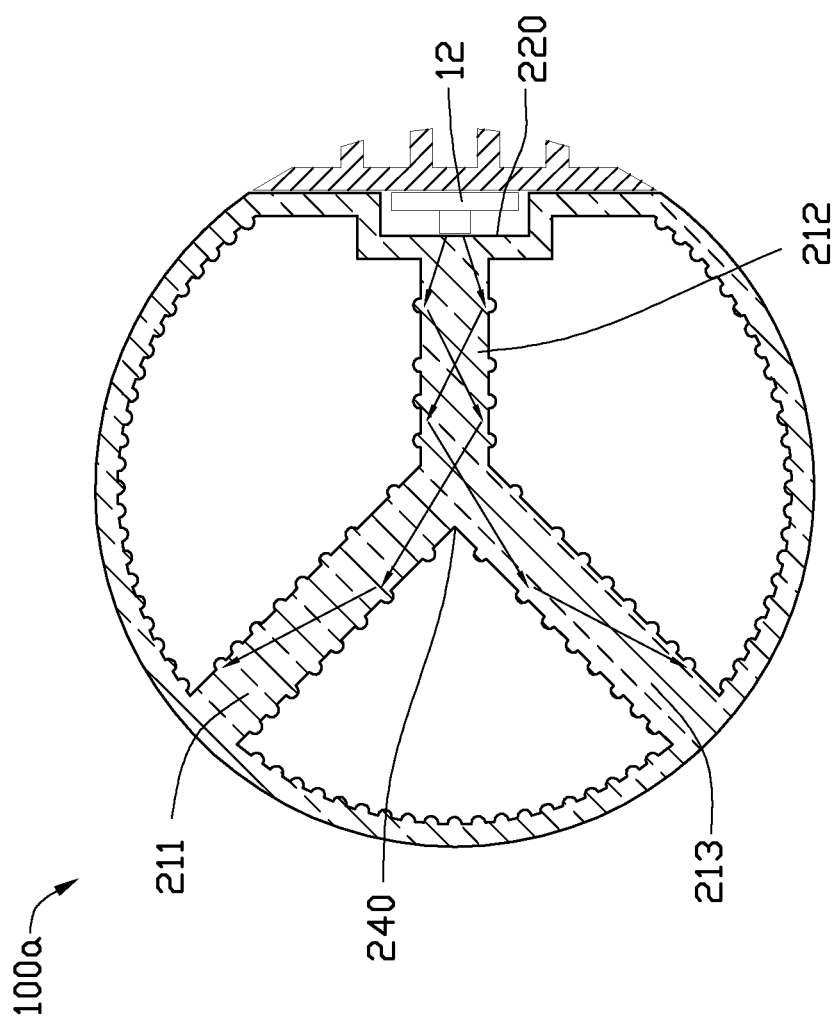
FIG. 4 is a schematic view showing a portion of the light from the LED light sources transmitted in the light guiding member of FIG. 2.

Referring to FIG. 4, after entering the second plate 212, a portion of the light is reflected by the opposite surfaces of the second plate 212 and transmitted to the intersection of the first plate 211 and the third plate 213. Then, a portion of the reflected light is reflected between the opposite surfaces of the first plate 211, and the other portion reflected between the opposite surfaces of the third plate 213.

Figure 5:
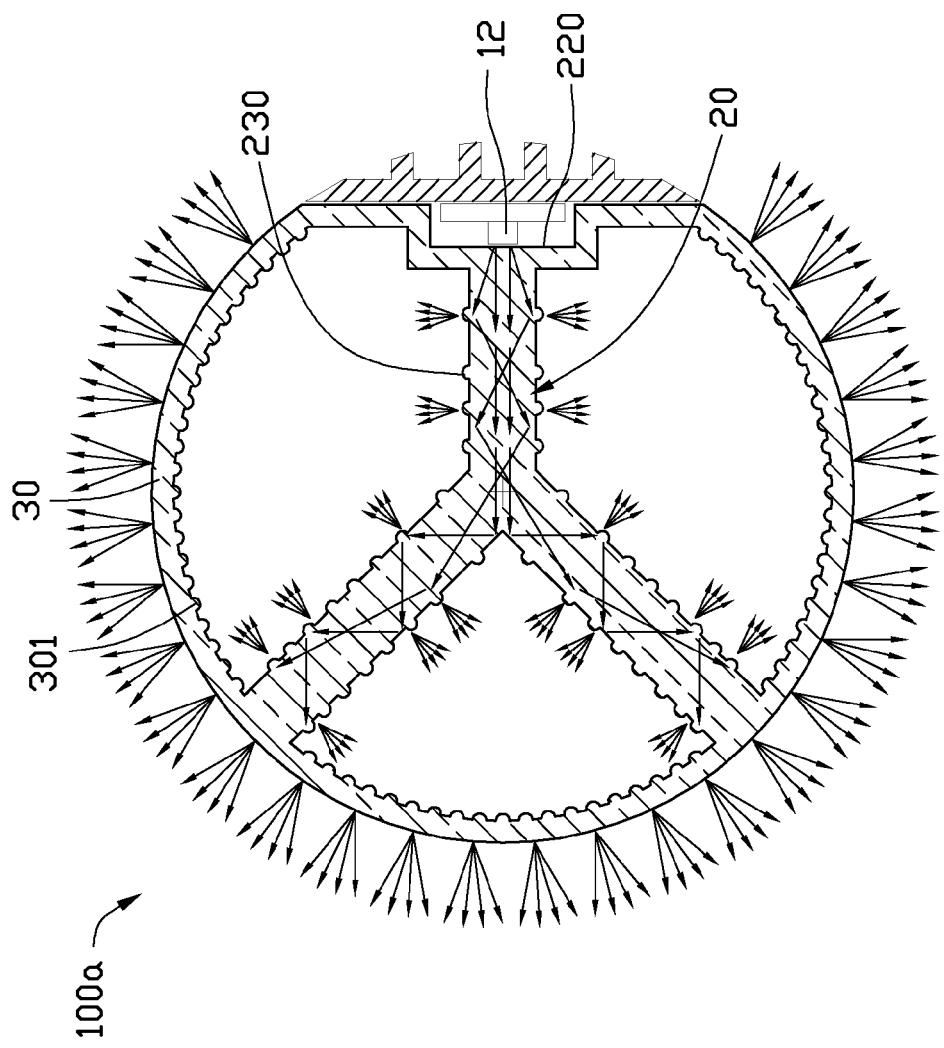
FIG. 5 is a lighting schematic view of the LED lighting device of FIG. 2.

Referring to FIG. 5, the light reaching the accentuated portions 230 is diffused and exits the light guiding member 20, finally being transmitted outside through the lampshade 30.

The lampshade 30 is made of optical material, and defines a plurality of accentuated portions 301 at its surfaces. In the embodiment, a plurality of elongated parallel protrusions 301 are distributed uniformly on the lateral surface of the lampshade 30. A cross-section of each elongated protrusion 301 along a line perpendicular to the longitudinal axis of the elongated protrusions 133, can be curved, oval, or triangular. Light exiting the lampshade 30 is further diffused, to achieve a uniform and soft effect on the outside surface of the lampshade 30.

Figure 6:
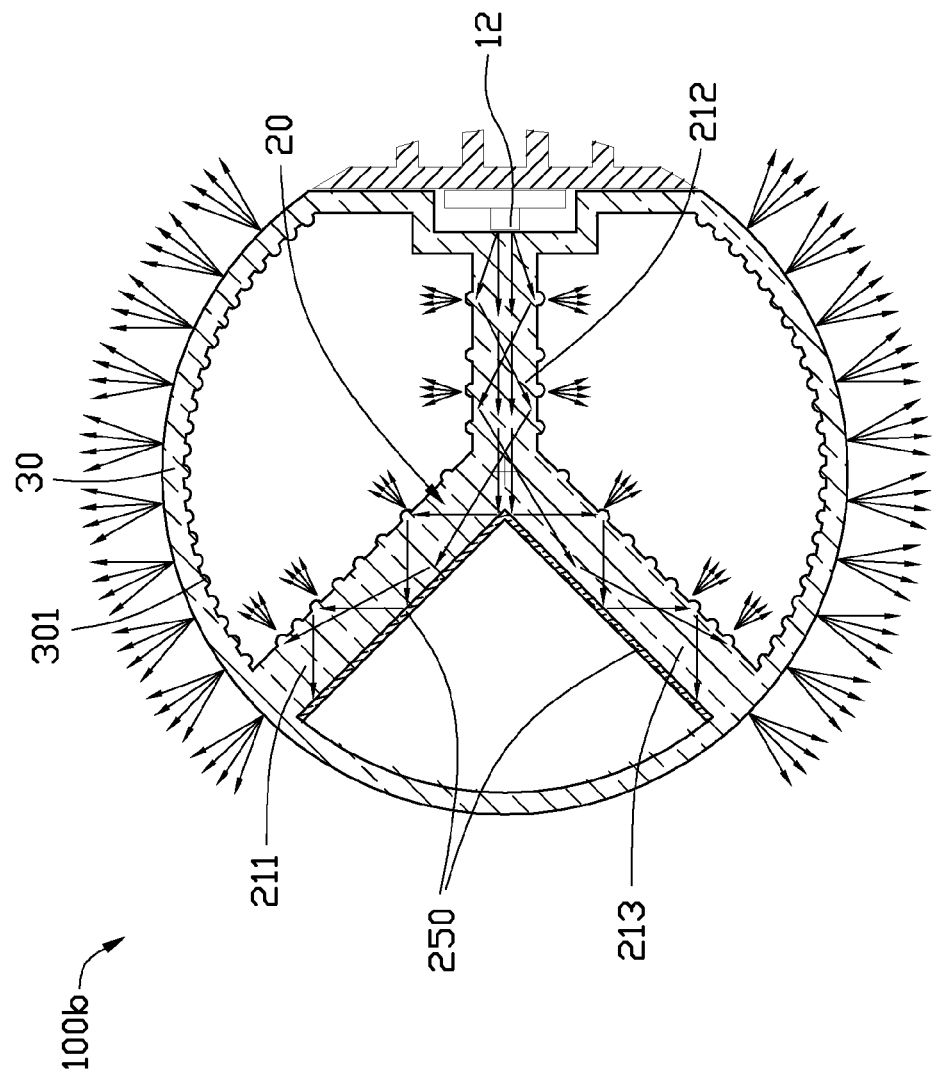
FIG. 6 is a lighting schematic view of a multidirectional LED lighting device according to a second embodiment.

In other embodiments, reflective film can be applied to one or more surfaces of the light guiding member 20, to prevent light from exiting the one or more surfaces, which allows the light from the light sources 12 to be directed substantially in a desired direction. For example, as shown in FIG. 6, a multidirectional LED lighting device 100b according to a second embodiment differs from LED lighting device 100a only in that two reflective films 250 are respectively applied to the adjacent surfaces of the first plate 211 and the third plate 213. The light reaching the reflective films 250 is respectively reflected to the surfaces opposite to the reflective films 250.

Figure 7:
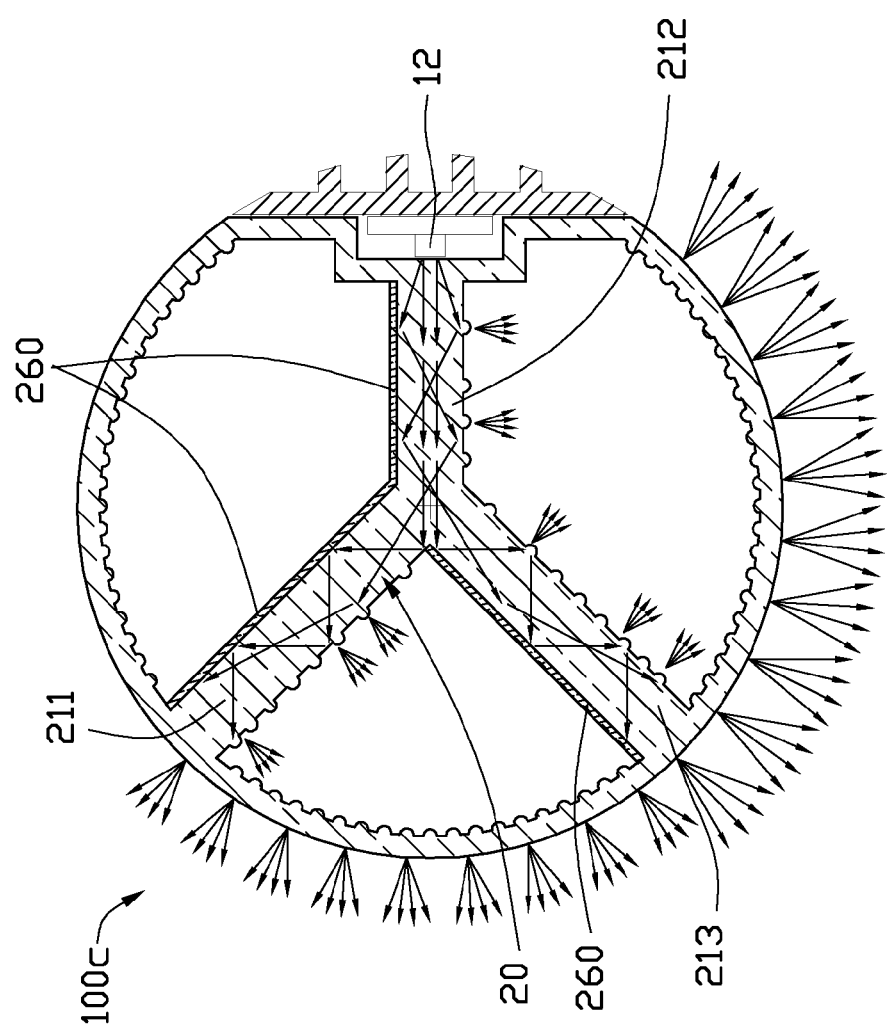
FIG. 7 is a lighting schematic view of a multidirectional LED lighting device according to a third embodiment.

Another example of multidirectional LED lighting device 100c is shown in FIG. 7, wherein LED lighting device 100c differs from LED lighting device 100a only in that reflective films 260 are respectively applied to the adjacent surfaces of the first plate 211 and the second plate 212 and the surface of the third plate 213 adjacent to the first plate 211. Light reaching the reflective films 260 is respectively reflected to the surfaces opposite to the reflective films 260. The light from the light sources 12 is directed to the area of the lampshade 30 that faces the accentuated side surfaces of the plates 211 and 212. The area of the lampshade 30, which faces the reflective films 260 on the plates 211 and 212, has no light directed thereon. In addition, due to the film 260 on the plate 213, the two illuminating areas at opposite sides of the plate 213 have different illumination intensity.

Moreover, it is to be understood that the disclosure may be embodied in other forms without departing from the spirit thereof. Thus, the present examples and embodiments are to be considered in all respects as illustrative and not restrictive, and the disclosure is not to be limited to the details given herein.

What is claimed is:

1. A light emitting diode (LED) lighting device shaped like a fluorescent tube, the LED lighting device comprising:
    a reflector and a circuit board detachably connected to the reflector along a lengthwise direction of the LED lighting device;
    a plurality of LED light sources distributed in a row on the circuit board along the lengthwise direction of the LED lighting device; and
    a light guiding member arranged inside the reflector and comprising a plurality of plates each having a connecting end and an opposite distal end, the connecting ends of the plurality of plates connecting together, and the distal ends of the plurality of plates respectively connected to an inner surface of the reflector; each plate comprising two surfaces, one or two of the surfaces defines a plurality of accentuated portions, one distal end of the plurality of plates defining a light incident surface opposing the LED light sources;
    wherein after entering the light guiding member from the light incident surface, the light from the LED light sources is reflected between opposite surfaces of each plate of the light guiding member; light reaching the accentuated portions is diffused and exits the light guiding member, finally being transmitted outside through the reflector.

2. The LED lighting device of claim 1, wherein the light guiding member comprises a first plate, a second plate and a third plate, which cooperatively form a Y-shape.

3. The LED lighting device of claim 2, wherein the first plate and the third plate extend radially from one end of the second plate.

4. The LED lighting device of claim 3, wherein the light incident surface is defined in the distal end of the second plate.

5. The LED lighting device of claim 3, wherein a total reflection structure is formed at the intersection of the first plate and the third plate, light is transmitted from the second plate to the first plate and the third plate after reflected by the total reflection structure.

6. The LED lighting device of claim 1, wherein reflective film is applied to one or more surfaces of the light guiding member, to prevent light from exiting the one or more surfaces, which allows the light from the light sources to be directed substantially in a desired direction.

7. The LED lighting device of claim 1, wherein the light guiding member is made of optical material.

8. The LED lighting device of claim 1, wherein the reflector is made of optical material.

9. The LED lighting device of claim 1, wherein a plurality of elongated parallel protrusions are distributed uniformly on the lateral surface of the reflector.

10. The LED lighting device of claim 9, wherein a cross-section of each elongated protrusion along a line perpendicular to the longitudinal axis of the elongated protrusions, is curved, oval-shaped or triangular.

\* \* \* \* \*